United States Patent [19]

Owens et al.

[11] 4,351,649

[45] Sep. 28, 1982

[54] CONTROL SYSTEM FOR GAS DEHYDRATORS

[75] Inventors: William R. Owens, Ridgefield, Conn.; Henry C. Chan, Port Arthur, Tex.; Ooriapadical C. Abraham, Nederland, Tex.; Levi C. Parker, Port Arthur, Tex.

[73] Assignee: Texaco Inc., White Plains, N.Y.

[21] Appl. No.: 278,135

[22] Filed: Jun. 29, 1981

Related U.S. Application Data

[63] Continuation-in-part of Ser. No. 96,862, Nov. 23, 1979, abandoned.

[51] Int. Cl.$^3$ ............................................ B01D 53/04
[52] U.S. Cl. ...................................... 55/162; 55/163; 55/179; 55/208; 55/275; 55/387
[58] Field of Search ................... 34/15, 54, 80; 55/20, 55/21, 31, 33, 35, 58, 62, 74, 75, 160-163, 179, 180, 208, 275, 387, 389; 422/62, 143

[56] References Cited

U.S. PATENT DOCUMENTS

| | | | |
|---|---|---|---|
| 1,892,428 | 12/1932 | Fonda | 55/161 X |
| 2,703,628 | 3/1955 | Pompeo et al. | 55/161 |
| 3,448,561 | 6/1969 | Seibert et al. | 55/20 |
| 3,540,188 | 11/1970 | Barrere, Jr. et al. | 55/20 |
| 3,775,946 | 12/1973 | Brazzel | 55/161 X |
| 3,944,400 | 3/1976 | Bird | 55/21 |
| 4,023,940 | 5/1977 | Shultz | 55/163 |
| 4,101,298 | 7/1978 | Myers et al. | 55/163 |
| 4,197,095 | 4/1980 | White, Jr. et al. | 55/20 |
| 4,205,967 | 6/1980 | Sandman et al. | 55/21 |

*Primary Examiner*—Robert H. Spitzer
*Attorney, Agent, or Firm*—Carl G. Ries; Robert A. Kulason; Ronald G. Gillespie

[57] ABSTRACT

A control system controls a plurality of gas dehydrators in which each dehydrator has a dessicant bed. The system includes sensors sensing parameters of gas entering and leaving each dehydrator which provide corresponding signals. First valve apparatus connected to each dehydrator receives moist gas. Second valve apparatus connected to each dehydrator provides for a discharging of dehydrated gas from each dehydrator in accordance with control signals. Third valve apparatus connected to each dehydrator receives regeneration gas and provides the regeneration gas to a dehydrator in accordance with control signals. Fourth valve apparatus connected to each dehydrator provides for the discharge of regeneration gas after passage through the dehydrator in accordance with control signals. A network connected to the sensors and to all the valve apparatus provides the control signals to the valve apparatus in accordance with the signals from the sensors, so as to cause the dehydrators to dehydrate the moist gas to provide dehydrated gas until such time as the bed within a dehydrator requires regeneration, at which time the regeneration gas is applied to that dehydrator until the bed is regenerated, whereupon that dehydrator once again receives the moist gas for dehydration. A channeling detector is connected to the sensors and provides an alarm when channeling of a bed has occurred.

13 Claims, 4 Drawing Figures

CONTROL SYSTEM FOR GAS DEHYDRATORS

CROSS REFERENCE TO RELATED APPLICATIONS

This application is a continuation-in-part of U.S. application Ser. No. 096,862, filed Nov. 23, 1979 by William R. Owens et al. and now abandoned.

BACKGROUND OF THE INVENTION

FIELD OF THE INVENTION

The present invention relates to control systems in general and, more particularly, to a control system for gas dehydrators.

SUMMARY OF THE INVENTION

A control system controls a plurality of gas dehydrators in which each dehydrator has a dessicant bed. The system includes sensors sensing parameters of gas entering and leaving each dehydrator which provide corresponding signals. First valve apparatus connected to each dehydrator receives moist gas. Second valve apparatus connected to each dehydrator provides for a discharging of dehydrated gas from each dehydrator in accordance with control signals. Third valve apparatus connected to each dehydrator receives regeneration gas and provides the regeneration gas to a dehydrator in accordance with control signals. Fourth valve apparatus connected to each dehydrator provides for the discharge of regeneration gas after passage through the dehydrator in accordance with control signals. A network connected to the sensors and to all the valve apparatus provides the control signal to the valve apparatus in accordance with the signals from the sensors, so as to cause the dehydrators to dehydrate the moist gas to provide dehydrated gas until such time as the bed within a dehydrator requires regeneration, at which time the regeneration gas is applied to that dehydrator until the bed is regenerated, whereupon that dehydrator once again receives the moist gas for dehydration. A channeling detector, connected to the sensors, provides an alarm when channeling of a bed has occurred.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
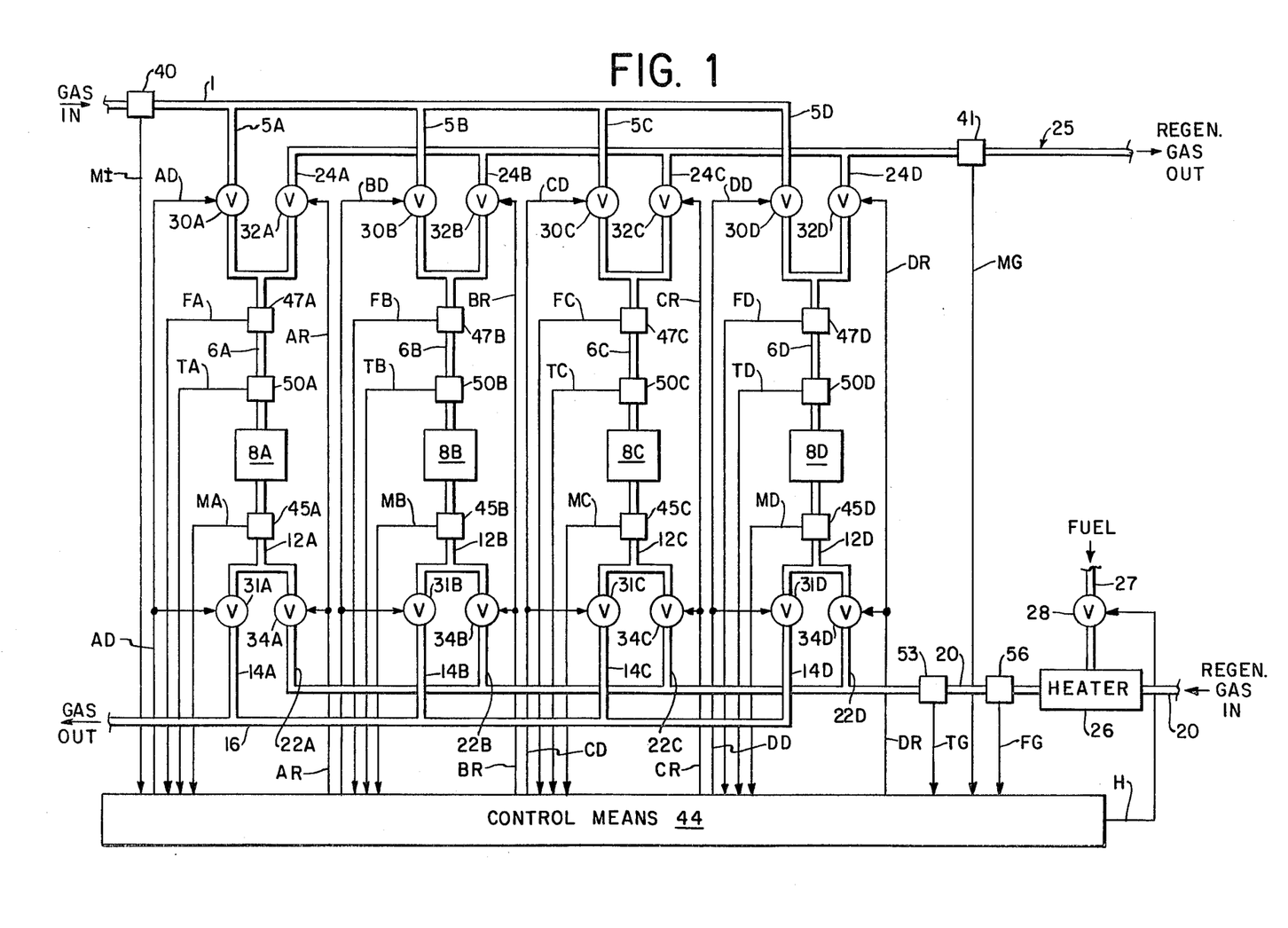
FIG. 1 is a simple block diagram showing a plurality of gas dehydrators being controlled by a control system constructed in accordance with the present invention.

Referring to FIG. 1, gas to be processed by dehydrators having dessicant beds is applied to line 1 where it is provided to dehydrators 8A through 8D via lines 5A and 6A through 5D and 6D. The dessicant bed may be a molecular sieve bed, alumina gel bed or a silica gel bed. It should be noted, as hereinafter explained, that there are times when one of the dehydrators is being regenerated while the remaining dehydrators are dehydrating the gas. The dehydrated gas leaves dehydrators 8A through 8D through line 12A and 14A through 12D and 14D to a discharge line 16. All elements having same suffix, i.e. A, B, C or D are associated with a dehydrator having the same suffix.

The regeneration gas path is as follows. The regeneration gas enters through line 20 and is applied to the individual dehydrators 8A through 8D by way of lines 22A and 12A through 22D and 12D, respectively, and leaves dehydrators 8A through 8D by way of lines 6A and 24A through 6D and 24D, respectively, and finally through a discharge line 25. A heater 26 heats the regeneration gas in line 20 and receives fuel by a line 27 having control valve 28 receiving a control signal H.

Valves 30A through 34A control the operation of dehydrator 8A so that when valves 30A and 31A are open and valves 32A and 34A are closed, dehydrator 8A is dehydrating the gas being provided from line 1. When valves 30A and 31A are closed and valves 32A and 34A are open, the dessicant bed in dehydrator 8A is being regenerated by the regeneration gas from line 20.

Dehydrators 8B, 8C and 8D operate and are regenerated in a similar manner as dehydrator 8A in conjunction with valves having the same muneric designations as valves 30A, 32A, 31A and 34A.

Moisture sensors 40 and 41 sense the moisure of the gas present in lines 1 and 25, respectively, and provide corresponding signals MI and MG, respectively, to control means 44. Moisture sensors 45A through 45D in lines 12 through 12D, respectively, provide signals MA through MD, respectively, corresponding to the moisture content of the gas flowing in lines 12A through 12D, respectively. Signals MA through MD are provided to control means 44.

Conventional type flow transmitters 47A through 47D provide signals FA through FD, respectively, corresponding to the gas flowing in lines 6A through 6D, respectively. Temperature sensors 50A through 50D, which may be of a conventional type, provide signals TA through TD, respectively, to control means 44 corresponding to the temperature of gas flowing in lines 6A through 6D. A temperature sensor 53 and a flow rate transmitter 56 provide signals TG and FG, respectively, to control means 44, corresponding to the temperature and to the flow rate of the regeneration gas in line 20 flowing from heater 26.

Figure 2:
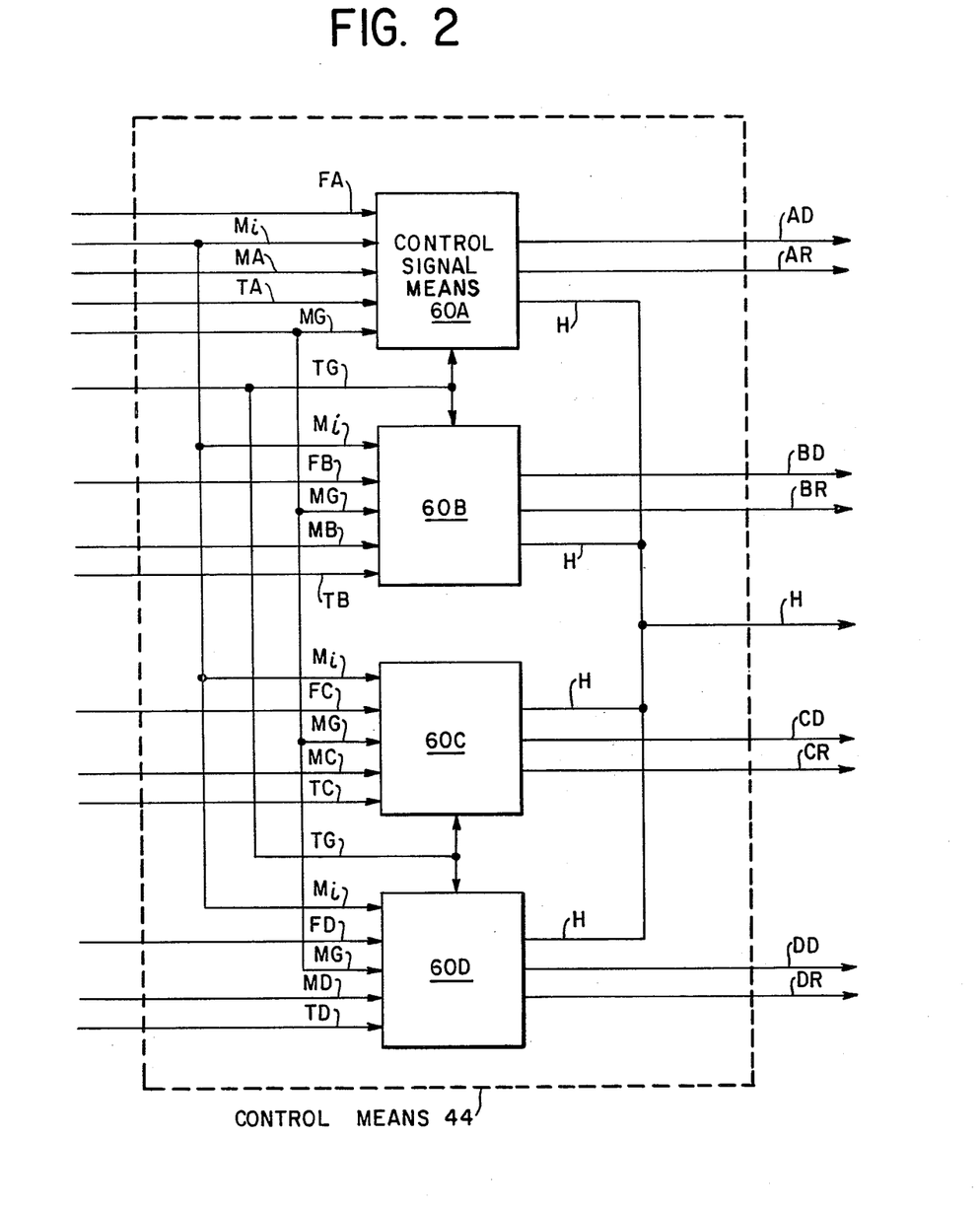
FIG. 2 is a simplified block diagram of the control means shown in FIG. 1.

Referring now to FIG. 2, control means 44 includes control signal means 60A, 60B, 60C and 60D which are identical in construction and operation but differ as to signals received and signals provided. Control signal means 60A receives signals Mi, MA, MG, FA, TA and TG and provides signals AD, AR and H, as hereinafter explained. Control signal means 60B receives signals Mi, MB, MG, FB, TB and TG and provides signals BD, BR and H. Control signal means 60C receives signals Mi, MC, MG, FC, TC and TG and provides signals CD, CR and H. Control signal means 60D receives signals Mi, MD, MG, FD, TD and TG and provides signals DD, DR and H. It should be noted that a particular control signal means only provides signal H when the dehydrator bed associated with the control signal means is to be regenerated as hereinafter explained.

Figure 3:
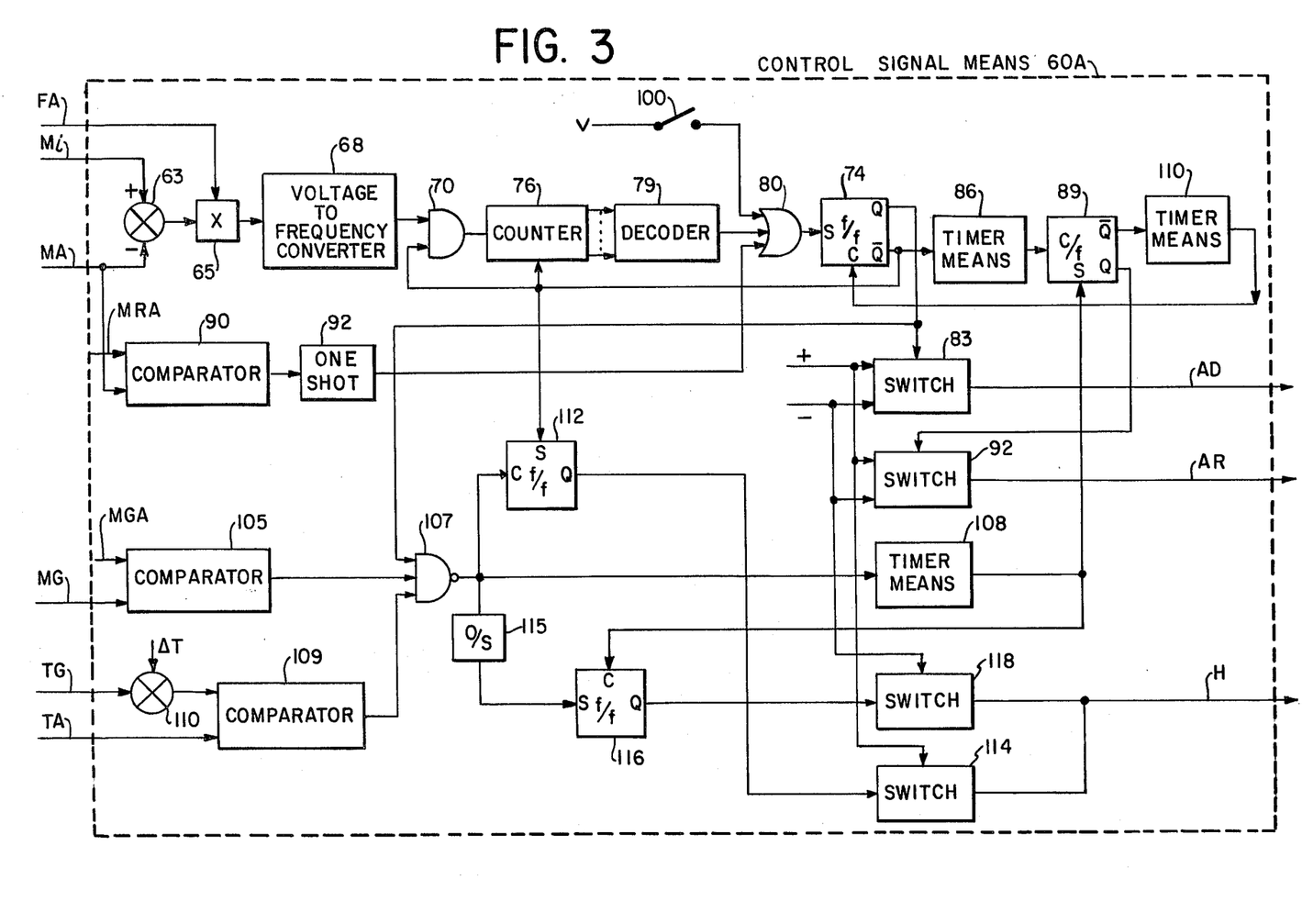
FIG. 3 is a detailed block diagram of one of the control signal means shown in FIG. 2.

Control signal means 60A, as can be seen in FIG. 3, includes subtracting means 63 subtracting signal MA from signal Mi to provide a signal corresponding to the moisture difference of the gas entering dehydrator 8A and the gas leaving dehydrator 8A. The signal provided by subtracting means 63 is multiplied with signal FA by multiplier 65 to provide a signal to a voltage-to-frequency converter 68. In essence, the signal provided by multiplier 65 corresponds to the moisture being adsorbed by dehydrator 8A over a period of time.

Voltage-to-frequency converter 68 provides pulses at a frequency corresponding to the voltage level of the signal from multiplier 65. The pulses from converter 68 are applied to an AND gate 70 receiving a control voltage from a $\bar{Q}$ output of a flip-flop 74 as hereinafter explained. When AND gate 70 is enabled, the pulses from converter 68 pass through AND gate 70 and are counted by a counter 76. Counter 76 provides digital signals, corresponding to its count, to a decoder 79. Decoder 79 provides a pulse when the count in counter 76 reaches a level corresponding to a predetermined adsorbed moisture content for the dehydrator 8A.

The pulse provided by decoder 79 passes through an OR gate 80 and is applied to a set input of flip-flop 74 causing flip-flop 74 to go to a set state. When in the set state, the voltages appearing at Q and $\bar{Q}$ outputs of flip-flop 74 are at a high logic level and a low logic level, respectively. When in the clear state, the voltages appearing at the Q and $\bar{Q}$ outputs are at a low logic level and a high logic level, respectively. Thus, prior to being set, the voltage at the $\bar{Q}$ output of flip-flop 74 is at a high logic level which enables AND gate 70. When the pulse from decoder 79 passes through OR gate 80 and triggers flip-flop 74 to a set state, the voltage at the $\bar{Q}$ output goes to a low logic level disabling AND gate 70 thereby preventing further counting by counter 76 and also resets counter 76 to a zero count.

The voltage appearing at the $\bar{Q}$ output of flip-flop 74 is applied to an electronic switch 83 receiving a positive DC voltage and a negative DC voltage. Switch 83 is in effect a single-pole, double-throw switch which selects either the positive direct current voltage or the negative direct current voltage and provides it as control signal AD. When the voltage at the Q output of flip-flop 74 is at a high logic level, switch 83 provides the negative DC voltage as signal AD, causing valves 30A and 31A to close.

The voltage at the Q output of flip-flop 74 is also applied to timer means 86 which is triggered by the voltage changing from a high logic level to a low logic level to provide a pulse to the clear input of another flip-flop 89 at the end of a predetermined time period. The voltage appearing at a Q output of flip-flop 89 is applied to a switch 92 receiving the positive and negative DC voltages and providing signal AR. Switch 92 operates in a similar manner as switch 83, with the voltage at the Q output of flip-flop 89 at a low logic level, since flip-flop 89 is now in the clear state, switch 92 provides the positive DC voltage as signal AR to open valves 32A and 34A so that regeneration gas will now pass through dehydrator 8A. Thus, timer means 86 provides a time delay assuring that valves 32A and 34A will not open while valves 30A and 31A are in the process of closing.

A comparator 90 receives signal MA and reference signal MRA corresponding to a predetermined moisture level for gas leaving dehydrator 8A. While signal MA is equal to or less than signal MRA, comparator 90 provides a high logic level signal to a one-shot multivibrator 92, when signal MA is greater than signal MRA, comparator 90 provides a low logic level signal to one-shot 90 causing it to provide a pulse. Thus, one-shot 92 provides the pulse when the moisture content of the gas leaving dehydrator 8A exceeds a specified moisture content for the gas being provided in line 16. The pulse from one-shot 92 passes through OR gate 80 and has the same effect as the pulse provided by decoder 79.

Further, it may be desirable that an operator might elect to regenerate the bed of dehydrator 8A which he may do by momentarily closing a switch 100 receiving a direct current voltage V. The momentary closing of switch 100 produces a pulse which passes through OR gate 80 with the same results as heretofore mentioned.

The regeneration of the dessicant bed in dehydrator 8A is considered complete when the moisture content of the regeneration gas leaving dehydrator 8A drops below a predetermined level or the temperature of the regeneration gas leaving dehydrator 8A reaches a predetermined level. In this regard, a comparator 105 compares signal MG with reference signal MGA, corresponding to desired moisture limit, to provide an output at a low logic level when the moisture content of the regeneration gas leaving dehydrator 8A does not exceed the desired moisture content for the regeneration gas and at a high logic level when moisture content of the regeneration gas leaving dehydrator 8A exceeds the limit. The output from comparator 105 is applied to a NAND gate 107.

Subtracting means 111 subtracts a DC voltage $\Delta T$ from signal TG to provide a signal to a comparator 109. Comparator 109 compares signal TA with the signal from subtracting means 111, to provide a signal to NAND gate 107 at a low logic level, when the temperature TA of the gas leaving dehydrator 8A exceeds the temperature TG of the regeneration gas less a predetermined heat loss for dehydrator 8A, and at a high logic level when the temperature TA of the gas leaving dehydrator 8A does not exceed the temperature TG of the regeneration gas less the heat loss. Voltage $\Delta T$ corresponds to the heat loss.

NAND gate 107 also receives the voltage appearing at the Q output of flip-flop 74. As noted previously the voltage at the Q output of flip-flop 74 is at a high logic level during the regeneration of dehydrator 8A which partially enables NAND gate 107. NAND gate 107 is thus responsive to the condition that when the moisture content and the temperature of the regeneration gas leaving dehydrator 8A are at desired levels and that the dehydrator 8A is being regenerated, NAND gate 107 then provides a low logic level output to trigger timer means 108 which after a suitable time delay provides a pulse to the set input of flip-flop 89 triggering it to the set state. This is indicative that regeneration has been completed. The time delay is to allow dehydrator 8A to cool down as hereinafter explained.

When triggered to the set state flip-flop 89 provides the voltage at its $\bar{Q}$ output at a high logic level to switch 92 causing switch 92 to provide the negative voltage as signal AR thereby causing valves 32A and 34A to close. The voltage at the Q output of flip-flop 89 goes from a high logic level to a low logic level, triggering a timer means 110, which acts as a time delay similar to timer means 86, to provide a pulse to the clear input of flip-flop 74. Flip-flop 74 is thereby triggered to the clear state. When in the clear state, the voltage at the Q output of flip-flop 74 goes to a low logic level causing switch 83 to provide the positive DC signal as signal AD to open valves 30A and 31A and to enable AND gate 70 so that the counting process may be renewed.

To conserve energy the regeneration gas is heated only during the regeneration process. Further, the heating process is stopped prior to the dehydrator being returned to an on-stream condition to allow the dehydrator to cool down. Startup of the heating process is accomplished by applying the Q output of flip-flop 74 to the set input of another flip-flop 112 whose Q output is applied to a single-pole, single throw type of electronic switch 114. A high logic level Q output from flip-flop 112 renders switch 114 conductive to provide the positive DC voltage as signal H. When signal H is positive, valve 28 in line 27 (see FIG. 1) is opened causing heater 26 to fire up.

The cooling off process for dehydrator 8A starts when the output from NAND gate 107, which is applied to the clear input of flip-flop 112, changes to a low logic level and triggers flip-flop 112 to a clear state. Flip-flop 112 Q output goes to a low logic level rendering switch 114 nonconductive to block the positive DC voltage.

The change in output from NAND gate 107 also triggers a one-shot multivibrator 115, to provide a pulse, after a predetermined time delay, which is applied to the set input of a flip-flop 116. The resulting high logic level Q output renders a single-pole, single throw type of electronic switch 118 conductive to provide the negative DC voltage as signal H. The time delay of one-shot 115 assures that switches 114 and 118 cannot be conductive at the same instant. A negative signal H closes valve 28 thereby shutting off heater 26.

The pulse from timer means 108, occurring at the end of regeneration operation, is applied to the C input of flip-flop 116 causing it to provide the Q output at a low logic level. The low logic level Q output from flip-flop 116 renders switch 118 non-conductive thereby blocking the negative DC voltage.

Signal MA, the output signal from comparator 109 and the signal at the Q output of flip-flop 89 are provided to channeling detection means 130. Channeling detection means 130 detects whether channeling has occurred in the dessicant bed of dehydrator 8A and provides an alarm. Channeling detection means 130 detects channeling when the moisture content of the dehydrated gas from dehydrator 8A has risen a substantial amount in a relatively short time period. Channeling detection means 130 also detects channeling during the regeneration process when the signal from comparator 109 indicates that the temperature of the regeneration gas leaving dehydrator 8A is substantially equal to the temperature for regeneration gas entering dehydrator 8A with this condition occurring within a predetermined time period as hereinafter explained.

Figure 4:
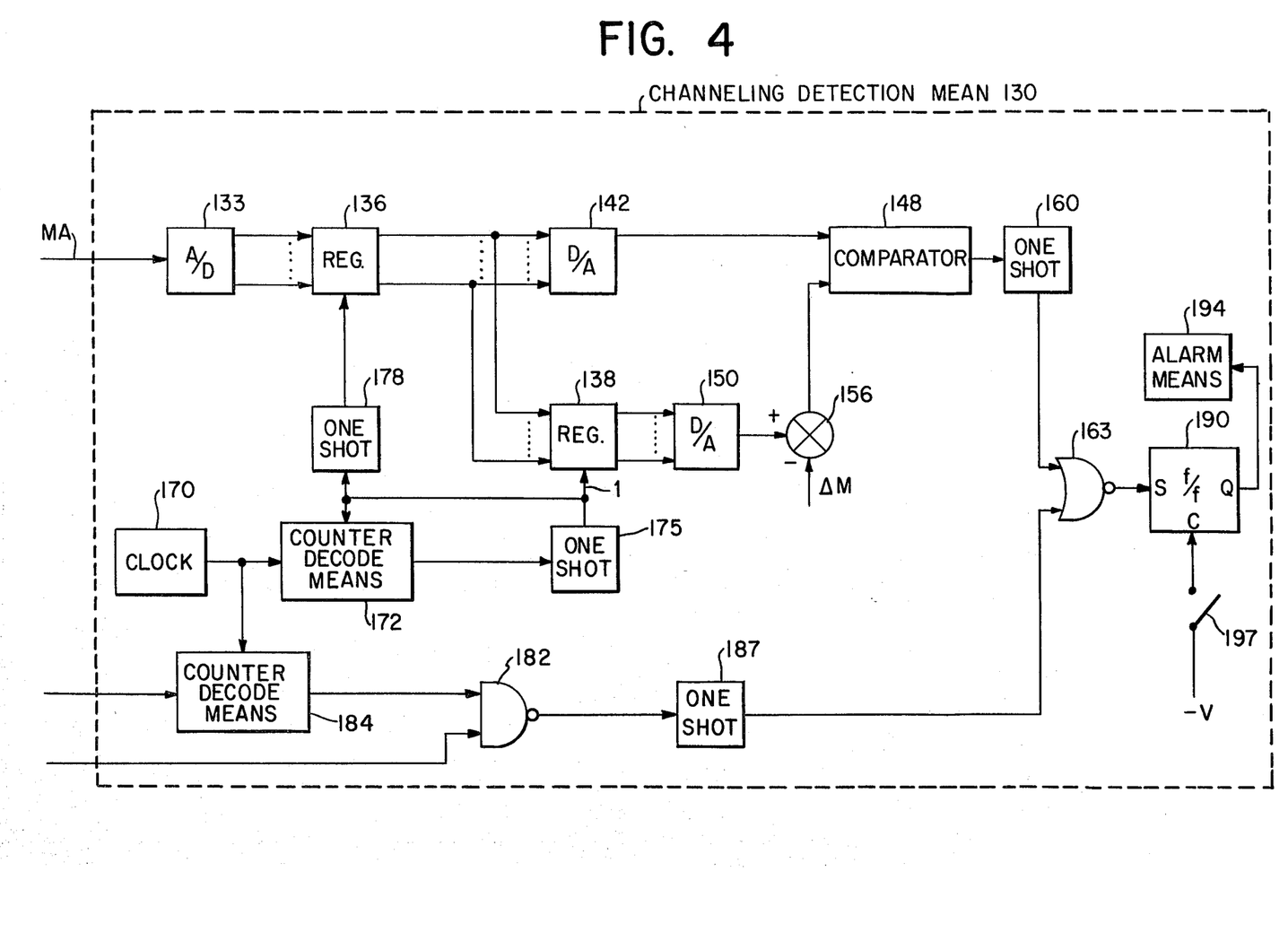
FIG. 4 is a detailed block diagram of the channeling detection means shown in FIG. 3.

Referring now to FIG. 4, signal MA is provided to an analog-to-digital converter 133 providing corresponding digital signals to a register 136. Register 136 provides digital signals representative of its contents to another register 138 and to a digital-to-analog converter 142. Digital-to-analog converter 142 provides an analog signal, corresponding to the contents of register 136, to a comparator 148. Register 138 provides digital signals, representative of its contents, to another digital-to-analog converter 150 which, in turn, provides a corresponding analog signal. Subtracting means 156 subtracts a direct current voltage ΔM, representative of a predetermined substantial change in moisture level, from the signal provided by digital-to-analog converter 150 to provide an output signal which is compared with the signal from digital-to-analog converter 142 by comparator 148. Comparator 148 has its output signal provided to a one-shot multivibrator 160 which, in turn, provides its signal to an inverting output OR gate 163. A clock 170 provides clock pulses to a counter decode means 172 which, after a predetermined count of pulses, provides a pulse output to a one-shot 175. One-shot 175 provides an 'enter' pulse to register 138. The 'enter' pulse from one-shot 175 is also provided to another one-shot multivibrator 178 which, in turn, provides another 'enter' pulse to register 136. The 'enter' pulse from one-shot 175 also resets counter decode means 172.

In operation, the contents in register 136, corresponding to the signal MA is transferred to register 138 before a new value of signal MA is entered so that comparator 148 is in essence comparing the analog signal corresponding to signal MA for a current cycle with the analog signal corresponding to MA signal for the previous cycle less the predetermined change in moisture content. Comparator 148 provides a high logic level signal when the signal from digital-to-analog converter 142 is less than the signal from subtracting means 156 and at a low logic level when the signal from digital-to-analog converter 142 is equal to or greater than the signal from subtracting means 156. During normal operation, comparator 148 is providing a high logic level signal to one-shot 160. When channeling occurs, the comparison signal from comparator 148 changes to a low logic level triggering one-shot 160 to provide a pulse.

The comparison signal from comparator 109 in control signal means 60A is provided to a NAND gate 182. Clock pulses from clock 170 are provided to another counter decode means 184 which provides pulses to a NAND gate 182 until a second predetermined time period count. Counter decode means 184 is reset at start of regeneration cycle by the signal provided by flip-flop 89 going to a low logic level. The output of NAND gate 182 is provided to a one-shot 187 which, in turn, provides an output to inverting OR gate 163. In operation, if no channeling has occurred during the regeneration cycle, the pulses provided by counter decode means 184 are blocked by NAND gate 182 which is disabled by the low logic level comparison signal from comparator 109. However, when channeling has occurred, the comparison signal from comparator 109 goes to a high logic level earlier than it would normally do so. Thus, NAND gate 182 is enabled during a time when counter decode means 184 is providing pulses so that NAND gate 182 passes negative pulses to trigger one-shot 187 to provide pulses to inverting OR gate 163.

The output of inverting OR gate 163 is provided to the set input of a flip-flop 190. Flip-flop 190 provides a high logic level signal at its Q output while in the set state and a low logic level signal at its Q output while in the clear state. The signal from the Q output flip-flop 190 is applied to alarm means 194. A negative voltage is provided to a manually operated single pole, single throw switch 197 which, when activated, provides a pulse to the clear input of flip-flop 190 triggering it to the clear state. In operation, a pulse provided by either one-shot 160 or 187 causes inverting OR gate 163 to provide negative pulses to flip-flop 190, the first negative pulse triggering flip-flop 190 to a set state. The resulting high logic level signal at the Q output causes alarm means 194 to be activated. Alarm means 194 may provide an audio or a visual signal, preferably it provides both. Upon noting the fact that an alarm has occurred, an operator may then activate switch 197 to reset flip-flop 190, thereby shutting off the alarm.

The present invention as hereinbefore described is an automatic control system for a plurality of dehydrators having dessicant beds. The system determines that regeneration of a bed is required, implements the regeneration, and returns the dehydrator on-line when regeneration is completed. The system also detects channeling in a bed, whether in a dehydrating mode or in a regeneration mode of operation.

What is claimed is:

1. A control system for a plurality of gas dehydrators, each dehydrator having a dessicant bed, comprising
    means for sensing the moisture of gas entering and leaving each dehydrator and providing moisture signals representative thereof,
    moist gas means connected to each dehydrator for providing moist gas to each dehydrator in accordance with control signals,
    dehydrated gas means connected to each dehydrator for discharging dehydrated gas from the dehydrator in accordance with control signals,
    regeneration gas means connected to each dehydrator for providing regeneration gas to each dehydrator in accordance with control signals,
    discharge regeneration gas means connected to each dehydrator for discharging regeneration gas from the dehydrator in accordance with control signals,
    control signal means connected to the sensing means, to the moist gas means, to the dehydrated gas means, to the regeneration gas means and to the discharge regeneration gas means for providing the control signals to the moist gas means, to the dehydrated gas means, to the regeneration gas means and to the discharge regeneration gas means in accordance with the signals from the sensing means so as to cause each dehydrator to dehydrate moist gas to provide dehydrated gas until the dessicant bed in the dehydrator requires regeneration and to then cause regeneration of the bed by applying the regeneration gas and discharging said regeneration gas after passage through the dehydrator until the bed is regenerated at which time the dehydrator again dehydrates moist gas, and
    channeling detection means connected to the moisture sensing means for detecting if channeling has occurred in a bed in accordance with the moisture signals.

2. A control system as described in claim 1 in which the channeling detection means includes
    means for periodically sampling each moisture signal representative of the moisture of the gas leaving a dehydrator, and
    alarm means connected to the sampling means for providing an alarm when the value of at least one moisture sample is greater by a predetermined amount than the value of the next previous sample of the same moisture signal.

3. A control system as described in claim 2 in which the moisture gas means includes
    a first plurality of valves receiving a plurality of first control signals from the control signal means, each valve means in said first plurality of valve means receiving a first control signal and moist gas for passing the moist gas to a corresponding dehydrator when the first control signal is of one amplitude and for blocking the moist gas when the first control signal is of another amplitude.

4. A control system as described in claim 3 in which a dehydrator gas means includes
    a second plurality of valve means receiving the plurality of first control signals from the control signal means, each valve means in said second plurality of valve means being connected to a corresponding dehydrator and receiving a first control signal for passing the dehydrated gas so as to discharge it when the first control signal is of the one amplitude and for not passing the dehydrated gas when the first control signal is of another amplitude.

5. A control system as described in claim 2 in which the regeneration gas means includes
    a third plurality of valve means receiving regeneration gas and a plurality of second control signals from the control signal means, each valve means of said third plurality of valve means being connected to a corresponding dehydrator and receiving the same second control signal that the valve means of the first plurality of valve means associated with the dehydrator receives for passing the regeneration gas to the dehydrator when the second control signal is of one amplitude and for blocking the regeneration gas when the second control signal is of another amplitude.

6. A control system as described in claim 5 in which the discharge regeneration gas means includes
    a fourth plurality of valve means receiving the plurality of second control signals from the control signal means, each valve means in said fourth plurality of valve means being connected to a corresponding dehydrator and receiving a fourth control signal for passing the regeneration gas from the dehydrator so as to discharge it when the fourth control signal is at one amplitude and for blocking the regeneration gas when the control signal is at another amplitude.

7. A control system as described in claim 6 in which the control signal means also provides a heater control signal; and further comprising
    heater means connected to the third plurality of valve means, receiving the regeneration gas and receiving the heater control signal from the control signal means for heating the regeneration gas in accordance with the heater control signal.

8. A control system as described in claim 7 in which said control signal means includes
    a plurality of means connected to the moisture sensing means for determining if a dehydrator bed is approaching saturation in accordance with the moisture signals and providing corresponding signals, each saturation determining means monitoring a corresponding dehydrator bed, and
    control signal network means connected to the sensing means, to the moist gas means, to the dehydrated gas means, to the regeneration gas means, to the discharge regeneration gas means and to the saturation determining means for providing the control signals to the moist gas means, to the dehydrated gas means, to the regeneration gas means and to the discharge regeneration gas means in accordance with the signals from all the saturation determining means and all the channeling detection means.

9. A control system as described in claim 1 or 8 in which the sensing means includes a plurality of flow sensing means for sensing the flow of gas through the dehydrator beds and providing corresponding signals;

each saturation determining means includes first comparing means connected to the sensing means and receiving a reference signal representative of a predetermined moisture level for the dehydrated gas leaving a corresponding dehydrator for providing a comparison signal, one-shot means connected to the first comparing means for providing a pulse in accordance with the comparison signal when the moisture signal associated with the dehydrated gas exceeds the reference signal, moisture content signal means connected to the sensing means for providing a signal corresponding to the moisture content of the bed in a corresponding dehydrator in accordance with the moisture signal associated with moist gas entering the dehydrator, the moisture signal associated with the discharge gas from the dehydrator and the flow signal associated with the gas flowing through the dehydrator, first pulse means connected to the moisture content signal means for providing a pulse output in accordance with the moisture content signal when the moisture content of the dehydrator's bed reaches a predetermined value; and network means including first switching means receiving a positive DC voltage, a negative DC voltage and a first logic signal for passing the positive voltage so as to provide the positive voltage as the first control signal while blocking the negative voltage so as to provide the negative voltage as the first control signal when the first logic signal is at one amplitude and for passing the negative voltage so as to provide the negative voltage as the first control signal while blocking the positive voltage when the first logic signal is at another amplitude, second switching means receiving the positive and negative voltages and a second logic signal for passing the positive voltage so as to provide the positive voltage as the second control signal while blocking the negative voltage when the second logic signal is at one amplitude and for passing the negative voltage so as to provide the negative voltage as the second control signal while blocking the positive voltage when the second logic signal is at another amplitude, second comparing means connected to the discharge regeneration gas moisture sensing means and receiving a reference signal corresponding to a predetermined moisture level for the discharged regeneration gas for providing a second comparison signal corresponding to the comparison, second pulse means connected to the second comparing means and responsive to the second comparison signal for providing a pulse when the moisture of the discharge regeneration gas changes from a value greater than the predetermined moisture level to a value less than the predetermined moisture level, and logic signal means connected to the one-shot means, to the first and second pulse means and to the first and second switching means for providing the first logic signal at the other amplitude in response to a pulse from the one-shot means or from the first pulse means and providing the second logic signal at the one amplitude after a predetermined time delay after the occurrence of the pulse from the one-shot means or from the first pulse means and for providing the second logic signal at the other amplitude in response to a pulse from the second pulse means and providing the first logic signal at the one amplitude after a second predetermined time delay after the occurrence of a pulse from the second pulse means.

10. A control system as described in claim 9 in which the first pulse means in each saturation determining means includes a manual operative pulse means for providing a pulse in response to manual operation, circuit means connected to the moisture content signal means for providing a pulse in accordance with moisture content signal when the moisture content of the corresponding dehydrator bed exceeds a predetermined value, and an OR gate connected to the logic signal means which passes pulses from either the manually operative pulse means or from the moisture content pulse means to the logic signal means.

11. A control system as described in claim 10 further comprising regeneration gas temperature sensing means for sensing the temperature of the regeneration gas leaving the heater means and providing a corresponding signal, and a plurality of temperature sensing means, each temperature sensing means of the plurality of temperature sensing means being associated with a corresponding dehydrator and sensing the temperature of discharge regeneration gas and providing a corresponding temperature signal;

in which each control signal newtwork means includes subtracting means connected to the regeneration gas temperature sensing means and receiving a direct current signal corresponding to a value to be subtracted from the regeneration gas temperature so as to provide a temperature reference signal, fourth comparing means connected to a corresponding temperature sensing means in the plurality of temperature sensing means and to the subtracting means for comparing the temperature reference signal and the temperature signal and providing a signal in accordance with the comparison, and the second pulse means provides its pulses in accordance with the third and fourth comparison signals from the third and fourth comparing means.

12. A control system as described in claim 11 in which each control signal network means includes third and fourth switching means having a common output connected to the heater means and receiving the negative voltage and the positive voltage, respectively, and a third and fourth logic signal, respectively, from the logic signal means for providing either the positive voltage or the negative voltage as the heater control signal in a manner so that after an occurrence of a pulse from the first pulse means, the third switching means provides the positive voltage as the heater control signal at the one amplitude, causing the heater to heat the regeneration gas and after an occurrence of a pulse from the second pulse means the fourth switching means provides the negative voltage as the heater control signal at the other amplitude to stop heating the regeneration gas.

13. A control system as described in claim 12 in which the sampling means includes
- a plurality of network sampling means, each network sampling means including
- an analog-to-digital converter receiving a moisture signal representative of the moisture level of dehydrated gas leaving a corresponding dehydrator and providing corresponding digital signals,
- first register means connected to the analog-to-digital converter for entering the digital signals from the analog-to-digital converter in response to a first 'enter' pulse and providing the entered digital signals,
- a first digital-to-analog converter connected to the first register means converts the digital signals provided by the first register means to an analog signal,
- second register means connected to the first register means for entering the digital signals provided by the first register means in response to a second 'enter' pulse and providing the entered digital signals,
- means connected to both register means for periodically providing the first and second 'enter' pulses to the first and second register means, respectively, in such a manner that the second 'enter' pulse is provided before the first 'enter' pulse is provided,
- a second digital-to-analog converter connected to the second register means converts the digital signals provided by the second register means to an analog signal,
- subtracting means connected to the second digital-to-analog converter means and receiving a DC voltage corresponding to a predetermined change in moisture level for dehydrated gas for subtracting the DC voltage from the analog signal provided by the second digital-to-analog converter, and
- fifth comparing means connected to the first digital-to-analog converter and to the subtracting means for comparing the signals from the first digital-to-analog converter and from the subtracting means to provide a comparison signal to the alarm means representative of the comparison.

* * * * *